US008478642B2

(12) United States Patent
Dey et al.

(10) Patent No.: US 8,478,642 B2
(45) Date of Patent: Jul. 2, 2013

(54) SYSTEM, METHOD AND DEVICE FOR PREDICTING NAVIGATIONAL DECISION-MAKING BEHAVIOR

(75) Inventors: Anind K. Dey, Pittsburg, PA (US); James Andrew Bagnell, Pittsburgh, PA (US); Brian D. Ziebart, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 317 days.

(21) Appl. No.: 12/581,879

(22) Filed: Oct. 20, 2009

(65) Prior Publication Data
US 2010/0106603 A1 Apr. 29, 2010

Related U.S. Application Data

(60) Provisional application No. 61/106,831, filed on Oct. 20, 2008.

(51) Int. Cl.
*G06Q 30/00* (2012.01)

(52) U.S. Cl.
USPC ...................................... 705/14.4; 705/14.63

(58) Field of Classification Search
None
See application file for complete search history.

(56) References Cited

U.S. PATENT DOCUMENTS

| 5,812,069 | A * | 9/1998 | Albrecht et al. ............. 340/905 |
| 6,212,473 | B1 | 4/2001 | Stefan et al. |
| 6,317,684 | B1 | 11/2001 | Roeseler et al. |
| 6,401,027 | B1 | 6/2002 | Xu et al. |
| 6,480,783 | B1 | 11/2002 | Myr |
| 6,611,754 | B2 | 8/2003 | Klein |
| 6,615,130 | B2 | 9/2003 | Myr |
| 6,701,248 | B2 | 3/2004 | Petzold et al. |
| 7,174,153 | B2 | 2/2007 | Ehlers |
| 7,174,154 | B2 | 2/2007 | Ehlers |
| 7,236,881 | B2 | 6/2007 | Liu et al. |
| 7,269,504 | B2 | 9/2007 | Gardner et al. |

(Continued)

FOREIGN PATENT DOCUMENTS

| DE | EP1722196 A1 | 11/2006 |
| EP | 1 551 195 A1 | 7/2005 |
| WO | WO 2007119559 A1 | 10/2007 |

OTHER PUBLICATIONS

Tapia, et al., "Activity Recognition in the Home Using Simple and Ubiquitous Sensors", 2004, pp. 158-175, Publisher: Proc. Pervasive.

(Continued)

*Primary Examiner* — Matthew T Sittner
(74) *Attorney, Agent, or Firm* — Loginov & Associates, PLLC; William A. Loginov

(57) ABSTRACT

A system method and device for predicting navigational decision-making behavior is provided. The location of a device is used to generate the current location of the device, and a history of past locations of the device. A behavior predicting application predicts the route a drive is going to travel based on driver preferences, such as left-hand turns, avoidance of bridges, etc., as well as the preferred destinations and/or routes traveled in the past. The preferences of a particular driver can be learned by the system to be implemented in the behavior predicting application, or manually input by the driver. The system can employ GPS or other positioning technology to determine the location of the device. The device can be a standard GPS-enabled in-car device, or other portable device such as a cell phone or PDA.

21 Claims, 9 Drawing Sheets

U.S. PATENT DOCUMENTS

| | | | |
|---|---|---|---|
| 7,363,144 B2 | 4/2008 | Liu et al. | |
| 2001/0025221 A1 | 9/2001 | Klein | |
| 2001/0029425 A1 | 10/2001 | Myr | |
| 2002/0121989 A1* | 9/2002 | Burns | 340/901 |
| 2003/0101036 A1* | 5/2003 | Nagel | 703/13 |
| 2004/0193707 A1 | 9/2004 | Alam et al. | |
| 2004/0236850 A1 | 11/2004 | Krumm et al. | |
| 2004/0252882 A1 | 12/2004 | Krumm et al. | |
| 2005/0031329 A1 | 2/2005 | Krumm | |
| 2005/0075119 A1 | 4/2005 | Sheha et al. | |
| 2005/0089223 A1 | 4/2005 | Krumm | |
| 2005/0093745 A1 | 5/2005 | Krumm et al. | |
| 2005/0125148 A1* | 6/2005 | Van Buer et al. | 701/209 |
| 2005/0204014 A1 | 9/2005 | Yao et al. | |
| 2005/0222764 A1 | 10/2005 | Uyeki et al. | |
| 2005/0258957 A1 | 11/2005 | Krumm et al. | |
| 2005/0270170 A1 | 12/2005 | Krumm et al. | |
| 2005/0270235 A1 | 12/2005 | Krumm et al. | |
| 2005/0270236 A1 | 12/2005 | Krumm et al. | |
| 2006/0034519 A1 | 2/2006 | Toyama et al. | |
| 2006/0034520 A1 | 2/2006 | Toyama et al. | |
| 2006/0045335 A1 | 3/2006 | Toyama et al. | |
| 2006/0046709 A1 | 3/2006 | Krumm et al. | |
| 2006/0047471 A1 | 3/2006 | Krumm | |
| 2006/0047472 A1 | 3/2006 | Krumm | |
| 2006/0052975 A1 | 3/2006 | Krumm | |
| 2006/0106530 A1 | 5/2006 | Horvitz et al. | |
| 2006/0106743 A1 | 5/2006 | Horvitz | |
| 2006/0119516 A1 | 6/2006 | Krumm et al. | |
| 2006/0149461 A1 | 7/2006 | Rowley et al. | |
| 2006/0167647 A1 | 7/2006 | Krumm et al. | |
| 2006/0173841 A1 | 8/2006 | Bill | |
| 2006/0178811 A1 | 8/2006 | Liu et al. | |
| 2006/0193516 A1 | 8/2006 | Toyama et al. | |
| 2006/0195291 A1 | 8/2006 | Krumm | |
| 2006/0195292 A1 | 8/2006 | Krumm | |
| 2006/0265447 A1 | 11/2006 | Krumm et al. | |
| 2007/0005243 A1 | 1/2007 | Horvitz et al. | |
| 2007/0005419 A1 | 1/2007 | Horvitz et al. | |
| 2007/0006098 A1 | 1/2007 | Krumm et al. | |
| 2007/0073477 A1* | 3/2007 | Krumm et al. | 701/209 |
| 2007/0085673 A1 | 4/2007 | Krumm et al. | |
| 2007/0143002 A1* | 6/2007 | Crowell et al. | 701/123 |
| 2008/0120025 A1* | 5/2008 | Naitou et al. | 701/207 |
| 2008/0162010 A1* | 7/2008 | Klotz et al. | 701/93 |
| 2009/0005974 A1* | 1/2009 | Lenneman et al. | 701/209 |
| 2009/0105934 A1 | 4/2009 | Tajima et al. | |
| 2010/0036601 A1* | 2/2010 | Ozawa et al. | 701/201 |
| 2010/0305850 A1 | 12/2010 | Krumm | |
| 2012/0089423 A1* | 4/2012 | Tamir et al. | 705/4 |

OTHER PUBLICATIONS

Ng, et al., "Algorithms for Inverse Reinforcement Learning", 2000, pp. 663-370, Publisher: Proc. ICML, Published in: US.

Likhachev, et al., "Anytime Dynamic A*: An Anytime, Replanning Algorithm", 2005, Publisher: American Association for Artificial Intelligence, Published in: US.

Pineau, et al., "Anytime Point-Based Approximations for Large POMDPS", Nov. 2006, pp. 335-380, vol. 27, Publisher: Journal of Artificial Intelligence Research, Published in: US.

Abbeel, et al., "Apprenticeship Learning Via Inverse Reinformcement Learning", "Proceedings of the 21st International Conference on Machine Learning", , Published in: CA.

Neu, et al., "Apprenticeship Learning Using Inverse Reinforcement Learning and Gradient Methods", 2007, pp. 295-302, Publisher: Proc. UAI, Published in: US.

Mayrhofer, "An Architecture for Context Prediction", , Publisher: Johannes Kepler Universitat Linz, Published in: AT.

Johannesson, et al., "Assessing the Potential of Predictive Control for Hybrid Vehicle Powertrains Using Stochastic Dynamic Programming", Mar. 2007, pp. 71-83, vol. 8, No. 1, Publisher: IEEE Transactions on Intelligent Transportation Systems, Published in: US.

Ramachandran, et al., "Bayesian Inverse Reinforcement Learning", , pp. 2586-2591, No. 07, Publisher: IJCAI, Published in: US.

Pohl, "Bi-Directional Search", 1971, pp. 127-140, vol. 6, Publisher: Edinburgh University Press.

Hull, et al., "Cartel: A Distributed Mobile Sensor Computing System", 2006, pp. 125-138, Publisher: ACM SenSys.

Goldberg, et al., "Computing the Shortest Path: A* Search Meets Graph Theory", Mar. 2004, pp. 156-165, Publisher: Proc. ACM-SIAM Symposium on Discrete Algorithms, Published in: US.

Lafferty, et al., "Conditional Random Fields: Probabilistic Models for Segmenting and Labeling Sequence Data", 2001, pp. 282-289, Publisher: Proc. ICML, Published in: US.

Boyd, et al., "Convex Optimization", 2004, p. 74 Publisher: Cambridge University Press, Published in: UK.

Ferguson, et al., "The Delayed D* Algorithm for Efficient Path Replanning", 2005, pp. 2045-2050, Publisher: Proc. ICRA, Published in: US.

Steinfeld, et al., "Destination Entry and Retrieval With the Ali-Scout Navigation System", 1996, No. UMTRI-96-30, Publisher: The University of Michigan Transportation Research Institute.

Schultes, et al., "Dynamic Highway-Node Routing", 2007, pp. 66-79, Publisher: WEA.

Sanders, et al., "Engineering Fast Route Planning Algorithms", 2007, pp. 23-36, Publisher: WEA.

Fredman, et al., "Fibonacci Heaps and Their Uses in Improved Network Optimization Algorithms", Jul. 1987, pp. 596-615, vol. 34, No. 3, Publisher: Journal of the Association for Computing Machinery, Published in: US.

Stentz, "The Focussed D* Aogrithm for Real-Time Replanning", Aug. 1995, pp. 775-814, vol. 38, No. 4, Publisher: Proceedings of the International Joint Conference on Artificial Ingelligence, Published in: US.

Nilsson, et al., "A Formal Basis for the Heuristic Determination of Minimum Cost Paths", 1968, pp. 100-107, No. 4, Publisher: IEEE Transactions on Systems Science and Cybernetics.

Koenig, "Improved Fast Replanning for Robot Navigation in Unknown Terrain", 2002, Publisher: Proc. ICRA, Published in: US.

Sofman, et al., "Improving Robot Navigation Through Self-Supervised Online Learning", 2006, vol. 23, No. 12, Publisher: Journal of Field Robotics, Published in: US.

Patterson, et al., "Inferring High-Level Behavior From Low-Level Sensors", 2003, pp. 73-89, Publisher: Proc. Ubicomp.

Jaynes, "Information Theory and Statistical Mechanics", May 15, 1957, pp. 620-630, vol. 106, No. 4, Publisher: The Physical Review, Published in: us.

Delling, et al., "Landmark-Based Routing in Dynamic Graphs", 2007, pp. 52-65, vol. 4525, Publisher: WEA Lecture Notes in Computer Science.

Liao, et al., "Learning and Inferring Transportation Routines", 2004, pp. 311-331, vol. 171, No. 5-6, Publisher: Artificial Intelligence, Published in: US.

Simmons, et al., "Learning to Predict Driver Route and Destination Intent", Sep. 17, 2006, pp. 127-132, Publisher: 2006 IEEE Intelligent Transportation Systems Conference, Published in: CA.

Bhattacharya, et al., "Lezi-Update: An Information-Theoretic Framework for Personal Mobility Tracking in PCS Networks", 2002, pp. 121-135, vol. 8, Publisher: Wireless Networks, Published in: US.

Bohnenberger, et al., "Location-Aware Shopping Assistance: Evaluation of a Decision-Theoretic Approach", 2002, pp. 155-169, Publisher: Proc. Mobile HCI.

Puterman, "Markov Decision Processes: Discrete Stochastic Dynamic Programming", 1994, pp. 277-283, Publisher: Wiley-Interscience.

Krumm, "A Markov Model for Driver Turn Prediction", Apr. 14, 2008, Publisher: SAE 2008 World Congress.

Dudik, et al., "Maximum Entropy Distribution Estimation With Generalized Regularization", 2006, pp. 123-138, Publisher: Proceedings of the 19th Annual Conference on Learning Theory, Published in: US.

Ziebart, et al., "Maximum Entropy Inverse Reinforcement Learning", 2008, Publisher: Proc. AAAI.

Ratliff, et al., "Maximum Margin Planning", 2006, pp. 729-736, Publisher: Proceedings of the 23rd International Conference on Machine Learning, Published in: US.

Bentley, "Multidimensional Binary Search Trees Used for Associative Searching", Sep. 1975, pp. 509-517, vol. 18, No. 9, Publisher: Association for Computing Machinery, Inc., Published in: US.

Refanidis, et al., "Multiobjective Heuristic State-Space Planning", 2003, pp. 1-32, vol. 145, No. 1-2, Publisher: Artif. Intel.

Mozer, "The Neural Network House: An Environment That Adapts to Its Inhabitants", 1998, pp. 110-114, Publisher: Proceedings of the American Association for Artificial Intelligence Spring Symposium on Intelligent Environments.

Mandow, et al., "A New Approach to Multiobjective A* Search", 2005, Publisher: Proc. ICAPS, Published in: US.

Dijkstra, "A Note on Two Problems in Connexion With Graphs", 1959, pp. 269-271, vol. 1, Publisher: Numerische Mathematik, Published in: DE.

Patel, et al., "Personalizing Routes", 2006, pp. 189-190, Publisher: Proc. UIST.

Kaelbling, et al., "Planning and Acting in Partially Observable Stochastic Domains", Dec. 17, 1997, pp. 99-134, vol. 101, No. 1-2, Publisher: Artif. Intell., Published in: US.

Krumm, et al., "Predestination: Inferring Destinations From Partial Trajectories", Sep. 17, 2006, pp. 243-260, Publisher: The Eighth International Conference on Ubiquitous Computing, Published in: US.

Fogarty, et al., "Predicting Human Interruptibility With Sensors", Mar. 2005, pp. 119-146, vol. 12, No. 1, Publisher: ACM Transactions on Computer-Human Interaction, Published in: US.

Mutlu, et al., "Robust, Low-Cost, Non-Intrusive Sensing and Recognition of Seated Postures", 2007, pp. 149-158, Publisher: Proc. UIST.

Chang, et al., "Tracking Free-Weight Exercises", 2007, pp. 19-37, Publisher: UbiComp.

Torkkola, et al., "Traffic Advisories Based on Route Prediction", 2007, Publisher: Workshop on Mobile Interaction with the Real World.

Hennessy, et al., "Traffic Congestion, Driver Stres, and Driver Aggression", 1999, pp. 409-423, vol. 25, Publisher: Aggressive Behavior.

Letchner, et al., "Trip Router With Individualized Preferences (TRIP): Incorporating Personalization Into Route Planning", 2006, pp. 1795-1800, Publisher: American Association for Artificial Intelligence, Published in: US.

Wyatt, et al., "Unsupervised Activity Recognition Using Automatically Mined Common Sense", 2005, pp. 21-27, Publisher: Proc. AAAI.

Ziebart, et al., "Navigate Like a Cabbie: Probalistic Reasoning From Observed Context-Aware Behavior", Sep. 24, 2008.

* cited by examiner (a)

(c)

(c)

(d)

SYSTEM, METHOD AND DEVICE FOR PREDICTING NAVIGATIONAL DECISION-MAKING BEHAVIOR

RELATED APPLICATIONS

This application claims the benefit of U.S. Provisional Application Ser. No. 61/106,831, filed Oct. 20, 2008, entitled APPARATUSES AND METHODS FOR PREDICTING DECISION-MAKING BEHAVIOR, the entire disclosure of which is herein incorporated by reference.

STATEMENT REGARDING FEDERALLY SPONSORED RESEARCH OR DEVELOPMENT

This invention was made, in part, with government support under Grant Number 15610.15.1120824 awarded by the National Science Foundation. The United States government may have certain rights in this invention.

FIELD OF THE INVENTION

The present invention is directed generally to apparatuses and methods for predicting decision-making behavior, and for related methods and applications.

BACKGROUND OF THE INVENTION

In the general field of predicting decision-making behavior, there are a number of approaches taught in the prior art. Each approach has deficiencies and problems that limit the effectiveness or practicality of those prior art approaches. In this section two general areas related to predicting decision-making behavior are discussed: sequential probabilistic modeling, and efficient goal-based modeling.

The goal of modeling decision-making behavior is to accurately predict the sequential behavior and decisions an agent would choose—e.g., the motions a person would take to grasp an object or the route a driver would take to get from home to work. One common approach to this problem is to directly model the conditional probability of actions based on the situation. In the navigation domain, for example, the situation could be the intersection where the driver is currently located and the driver's intended destination. A Markov model constructed for this setting then predicts the driver's next action (i.e., the road he or she will next travel on) based on the empirical frequencies of what has historically happened in the same situation. A major limitation of this approach is that there is often limited or no historical experience with the exact same situation, so the empirical frequencies are poor estimates of future behavior. Related are memory-based approaches that try to combine previously executed routes to create a suitable route between two different locations. These suffer from the same limitations.

A large number of systems have been developed that employ this approach for predicting decision-making In "an Information-theoretic framework for personal mobility tracking in pcs networks", *Wireless Networks* (2002), Bhattacharya and Das used Markov predictors to develop a probability distribution of transitions from one GSM cell to another. Ashbrook and Starner, in "Using GPS to learn significant locations and prediction movement", *Personal and Ubiquitous Computing* (2003), take a similar approach to develop a distribution of transitions between learned significant locations from GPS data. Patterson et al. in "inferring high-level behavior from low-level sensors", *Proc. Ubicomp* (2003), used a Bayesian model of a mobile user conditioned on the mode of transportation to predict the user's future location. Mayrhofer extends this existing work in location prediction to that of context prediction, or predicting what situation a user will be in, as discussed in "an architecture for context prediction", PhD thesis of Johannes Kepler University of Linz (2004), by developing a supporting general architecture that uses a neural gas approach. In "the Neural Network House: An environment that adapts to its inhabitants", *AAAI Spring Symposium* (1998), a smart home observed the behaviors and paths of an occupant and learned to anticipate his needs with respect to temperature and lighting control. The occupant was tracked by motion detectors and a neural network was used to predict the next room the person was going to enter along with the time at which he would enter and leave the home. Liao et al. in "Learning and inferring transportation routines", *Artificial Intelligence* (2007), model transportation decisions using a directed graphical model, a probabilistic framework for representing these conditional probabilities.

An alternate view of modeling decision-making behavior is that the decision-maker is modeled as choosing actions by solving a sequential decision-making or planning problem. In this view, the model need only estimate the parameters of that decision-making problem to predict behavior.

In the inverse optimal control setting (also variously referred to as inverse reinforcement learning, imitation learning, and apprenticeship learning in the field), an agent's behavior (i.e., its trajectory or path, $\zeta$, of states $s_i$ and actions $a_i$) in some planning space is observed by a learner trying to model or imitate the agent. The agent is assumed to be attempting to optimize some function that maps (by, e.g. a linear function) the features of each state, $f_{s_j} \in \Re^k$, to a state reward value representing the agent's utility for visiting that state. This function is parameterized by some reward weights, $\theta$. The reward value of a trajectory is simply the sum of state rewards, or, equivalently, the reward weight applied to the path feature counts, $$f_\zeta = \sum_{s_j \in \zeta} f_{s_j}$$

which are the sum of the state features along the path as shown in Equation (i).

$$\text{reward}(f_\zeta) = \theta^T f_\zeta = \sum_{s_j \in \zeta} \theta^T f_{s_j} \qquad \text{Equation (i)}$$

The agent demonstrates trajectories, $\tilde{\zeta}_i$, and each has an empirical feature count, $$\tilde{f} = \frac{1}{m} \sum_i f_{\tilde{\zeta}_i}$$

based on many (m) demonstrated trajectories.

Abbeel & Ng (2004) approach the Inverse Optimal Control problem in "Apprenticeship learning via inverse reinforcement learning", *Proc. ICML*, by matching feature expectations (Equation ii) between an observed policy and a learner's behavior; they demonstrate that this matching is sufficient to achieve the same performance as the agent if the agent were in fact solving a decision-making problem with a reward function linear in those features.

$$\sum_{Path\ \zeta_i} P(\zeta_i) f_{\zeta_i} = \tilde{f} \qquad \text{Equation (ii)}$$

Recovering the agent's exact reward weights is an ill-posed problem; many reward weights, including degeneracies make demonstrated trajectories optimal.

The main limitation of the inverse optimal control approach is that it is designed for prescribing or controlling behavior rather than predicting what behavior will actually occur. In fact, it is common for the actual behavior that occurs to have zero probability of occurring within an inverse optimal control model of behavior.

A specialized approach has been developed for navigation based on the notion of efficiency. The PreDestination model (Krumm & Horvitz 2006) in "Predestination: inferring destinations from partial trajectories", *Proc. Ubicomp*, does not model the specific actions of a driver in trying to reach a destination, but instead discretizes the world into a grid of cell. The probability of the driver having an intended destination within a particular cell is based on the efficiency of the driver's route so far in traveling from the driver's starting location to that potential destination cell location. If the driver's current location is a very inefficient intermediate cell to travel through to reach the potential destination cell, that destination cell will have a low probability in their model. This approach is limited in its predictive abilities to only being able to predict the destination of the driver and not being able to predict the path the driver will take to reach that destination.

Accordingly, there is a need for improved systems and methods for modeling navigational behavior, including prediction of future routes and recommendations of new routes. Those and other advantages of the present invention will be described in more detail hereinbelow.

SUMMARY OF THE INVENTION

The present invention overcomes the disadvantages of the prior art by providing a system and method for predicting navigational decision-making behavior. The system includes a route prediction and recommendation device that includes a location unit for determining the current location of the device. The system also has a behavior predicting application that predicts the route a driver is intending to travel based on the current location of the device. The behavior predicting application also predicts the route based upon other predetermined factors, such as the frequency of a particular action or location of the device. These predetermined factors include driver preferences, such as making left hand turns, or avoiding bridges, and also route traveled preferences, based on particular locations and/or routes that are preferred.

According to the procedure of the illustrative embodiments, driver preference data is obtained from a driver using the route predicting device. This driver preference data can be obtained manually via appropriate input from the driver to the device. Alternatively, the driver preference can be learned by a behavior predicting application to monitor the driving style and patterns of driving for the driver. The procedure also obtains routes traveled data based upon a current location of the device, and at least one past location of the device. The driver preference data and the routes traveled data are used together to generated a predicted route for a particular driver.

These and other teachings, variations, and advantages of the illustrative embodiments will become apparent from the following detailed description.

BRIEF DESCRIPTION OF THE DRAWINGS

The invention description below refers to the accompanying drawings, of which.

DETAILED DESCRIPTION

The present invention will be described in terms of Probabilistic Reasoning from Observed Context-Aware Behavior, and Collaborative Planning Problems. The present invention is generally directed to navigational prediction and planning and related applications and technology, and the present invention is generally described in the context of automotive applications. However, the present invention is not so limited, and it has many applications and variations. The description presented herein is illustrative of the present invention and not limiting.

Figure 1:
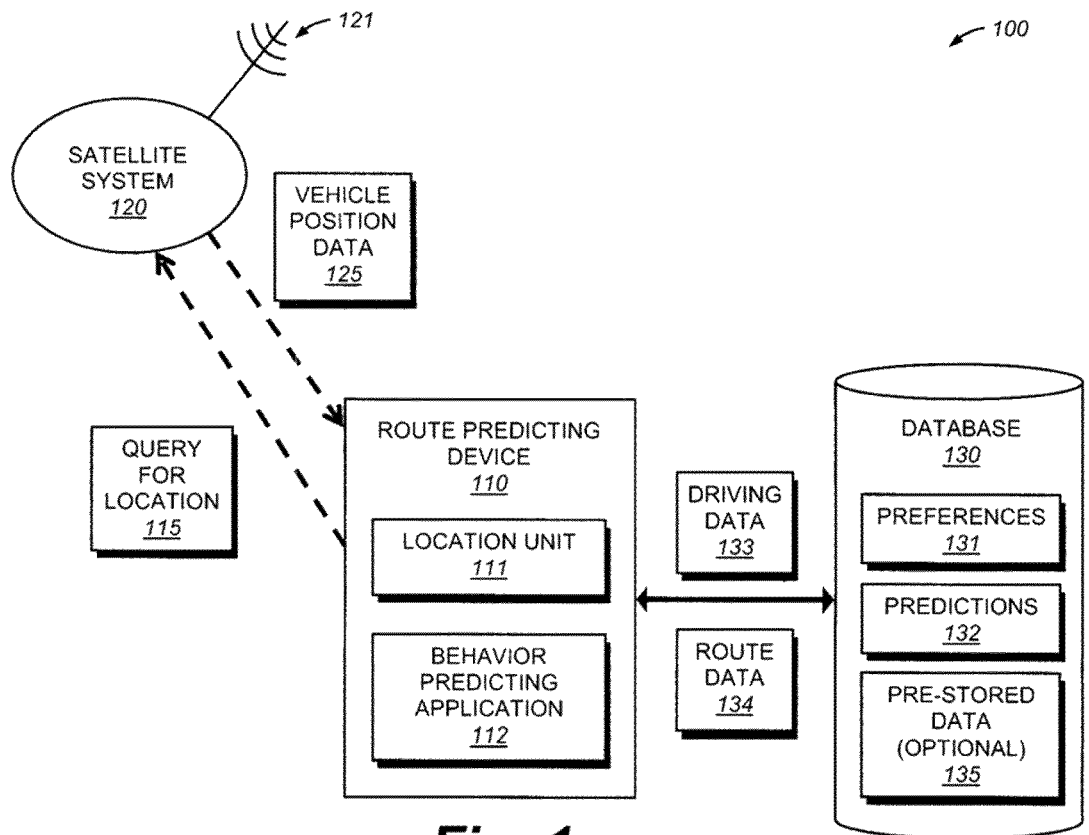
FIG. 1 is a block diagram showing the overall system architecture for a system for predicting navigational decision-making behaviors according to an illustrative embodiment.

The system for predicting decision-making behavior is shown as implemented in a GPS-enabled environment in FIG. 1. As shown, in a decision-making prediction system 100 there is a route predicting device 110 having a location unit 111, such as a GPS enabled device in this embodiment for ascertaining the location of the device 110. The predicting device 110 also includes a behavior predicting application 112, which performs the predicting of the system 100. The location receives location data via datastream 115 from a satellite 120. While a GPS-enabled device 111 and satellite 120 are depicted, any appropriate means by which the location of the device 110 is ascertained can be employed. This can include accelerometers within the device to determine the location of the device, as well as other types of sensors that communicate with other sensors and receivers to determine the location of the route predicting device 110. Alternatively, the sensor can comprise a mechanical or solid state gyro for sensing the location of the device. For example, a query for location data can be transmitted via datastream 115 to a satellite system 120 or other positioning device. The satellite system 120 communicates with the route predicting device 110 via appropriate antenna 121 or other equivalents thereof. The vehicle position data is then transmitted back to the route predicting device 110 via datastream 125. The behavior predicting application 112 uses the vehicle position data 125 as well as other data to determine the intended route of the user. The driving data can be transmitted to a database 130, as shown in FIG. 1 via datastream 133, and route traveled data can be transmitted similarly via datastream 134. It is also expressly contemplated that the 'database' 130 can comprise internal memory within the route predicting device that includes all data necessary for predicting the intended route of the user.

The database 130 includes driver preferences 131, predictions 132 based upon driving data and route data are stored in the database. The database can also include pre-stored data 135 that includes data for other users so as to create preferences based upon a group of drivers, if so desired. The pre-stored data 135 can also include preferences that were previously manually selected by the user to determine the intended route of travel.

Probabilistic Reasoning from Observed Context-Aware Behavior

Figure 2:
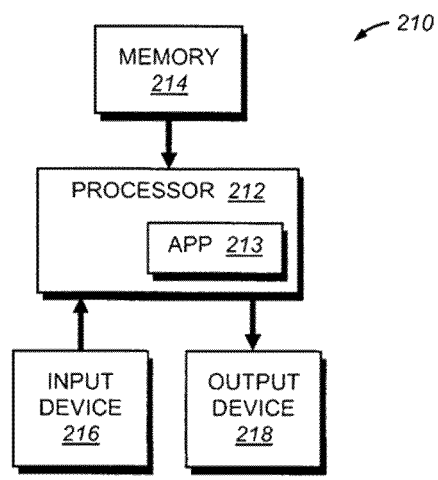
FIG. 2 shows a decision-making prediction device according to the illustrative embodiments for predicting navigational decision-making.

The present invention can be implemented for navigation devices that learn drivers' preferences and habits, and provide valuable services by reasoning about driver behavior. As shown in FIG. 17 and described below, the devices can be implemented on a standard GPS device used within a vehicle to determine the intended route of a user driving the vehicle. FIG. 2 shows an exemplary device 210 according to an illustrative embodiment.

FIG. 2 illustrates one embodiment of a system 210 according to the present invention. In that embodiment, the system 210 includes a processor 212, memory 214, an input device 216, and an output or display device 218, such as a monitor. The processor 212 is connected to the memory 214, the input device 216, and the output device 218. The memory 214 includes computer readable instructions, such as computer hardware, software, firmware, or other forms of computer-readable instructions which, when executed by the processor 212, cause the processor 212 to perform certain functions, as described herein. As described above, the system 210 can take many forms, such as a navigation system in an automobile, a portable navigation system, mobile phone, smart phone, a PDA, a system within a building or other facility, or any Internet-enabled device.

The processor 212 receives input from the input device 216 and provides signals to control the output device 218. The processor 212 also performs certain functions, as described herein.

The memory 214 can be any for of computer-readable memory, and can store information in magnetic form, optical form, or other forms. The memory includes computer readable instructions which, when executed by the processor 212, cause the processor 212 to perform certain functions, as described herein. The memory 214 can be separate from the processor 212, or the memory 214 can be integrated with the processor 212. The memory 214 can also include more than one memory device, which can be integrated with the processor 212, separate from the processor 212, or both.

The input device 216 can be a keyboard, a touchscreen, a computer mouse, or other forms of inputting information from a user. For example, the input can be a touch screen in an automobile, on a mobile phone, or on a PDA.

The output device 218 can be a video display or other forms of outputting information to a user. For example, the output device can be a video display in an automobile, on a cell phone, or on a PDA. In some embodiments, the output is audio, and in those embodiments the output device can be a speaker or other audio device.

Many variations are possible with the system 210 according to the present invention. For example, more than one processor 212, memory 214, input device 216, and output device 218 can be present in the system 210. In addition, devices not shown in FIG. 2 can also be included in the system 210, and devices shown in FIG. 2 can be combined or integrated together into a single device, or omitted.

These devices can incorporate real-time contextual information, like accident reports, and a detailed knowledge of the road network to help mitigate the many unknowns drivers face every day. They can provide context-sensitive route recommendations, as discussed in "Personalizing routes", *Proc. UIST* (2006), by K. Patel et al., that match a driver's abilities and safety requirements, driving style, and fuel efficiency trade-offs. As discussed in "Traffic advisories based on route prediction", *Workshop on Mobile Interaction with the Real World* (2007), by K. Torkkola et al., they can also alert drivers of unanticipated hazards well in advance—even when the driver does not specify the intended destination, and better optimize vehicle energy consumption using short-term turn prediction, as discussed in "Assessing the potential of predictive control for hybrid vehicle powertrains using stochastic dynamic programming", *IEEE Transactions on Intelligent Transportation Systems* (2007) by L. Johannesson et al.

In this section, an illustrative embodiment is sometimes referred to as "PROCAB", a method for Probabilistically Reasoning from Observed Context-Aware Behavior. PROCAB enables reasoning about context-sensitive user actions, preferences, and goals—a requirement for realizing ubiquitous computing systems that provide the right information and services to users at the appropriate moment. Unlike other methods, which directly model action sequences one decision at a time, PROCAB models the negative utility or cost of each action as a function of contextual variables associated with that action. This allows it to model the reasons for actions rather than the immediate actions themselves. These reasons generalize to new situations and differing goals. In many settings, reason-based modeling provides a compact model for human behavior with fewer relationships between variables, which can be learned more precisely. PROCAB probabilistically models a distribution over all behaviors (i.e., sequences of actions) as discussed in "Maximum entropy inverse reinforcement learning", *Proc. AAAI* (2008) by B. D. Ziebart et al., using the principle of maximum entropy as discussed in "Information theory and statistical mechanics", *Physical Review* (1957), by E. T. Jaynes, within the framework of inverse optimal control (also sometimes referred to as inverse reinforcement learning, apprenticeship learning, or imitation learning) as discussed by Ng and Russell in "Algorithms for inverse reinforcement learning", *Proc. ICML* (2000).

In vehicle navigation, roads in the road network differ by type (e.g., interstate vs. alleyway), number of lanes, speed limit, and other characteristics. In the PROCAB model, a driver's utility for different combinations of these road characteristics is learned, rather than the driver's affinity for particular roads. This allows generalization to locations where a driver has never previously visited.

Useful applications of the system are realized based on three prediction tasks: (1) Turn Prediction: What is the probability distribution over actions at the next intersection? (2) Route Prediction: What is the most likely route to a specified destination? (3) Destination Prediction: What is the most probable destination given a partially traveled route?

PROCAB: Context-Aware Behavior Modeling

The variability of route preference from person to person and from situation to situation makes perfectly predicting every route choice for a group of drivers extremely difficult. The more modest goal of developing a probabilistic model is adopted that assigns as much probability as possible to the routes the drivers prefer. Some of the variability from personal preference and situation is explained by incorporating contextual variables within our probabilistic model. The remaining variability in the probabilistic model stems from influences on route choices that are unobserved by our model.

Many different assumptions and frameworks can be employed to probabilistically model the relationships between contextual variables and sequences of actions. The PROCAB approach is based on three principled techniques: (1) Representing behavior as sequential actions in a Markov Decision Process (MDP) with parametric cost values. (2) Using *Inverse Optimal Control* to recover cost weights for the MDP that explain observed behavior. (3) Employing the principle of maximum entropy to find cost weights that have the least commitment.

The resulting probabilistic model of behavior is context-dependent, compact, and efficient to learn and reason with.

Markov Decision Process Representation

Figure 3:
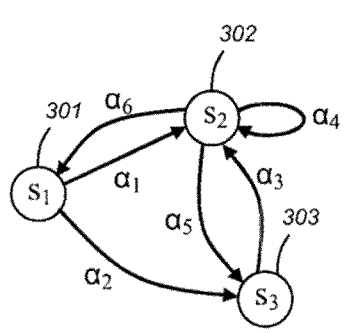
FIG. 3 illustrates the states and actions of decision problem according to a deterministic MDP in FIG. 3A, with FIG. 3B showing a single path (i.e., sequence of decisions) from the path space, a non-deterministic MDP in FIG. 3C, with a single path to form the path space in FIG. 3D, according to the illustrative system and method.
Figure 3:
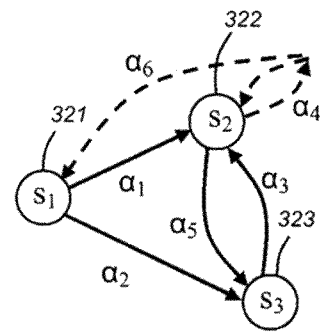
Figure 3:
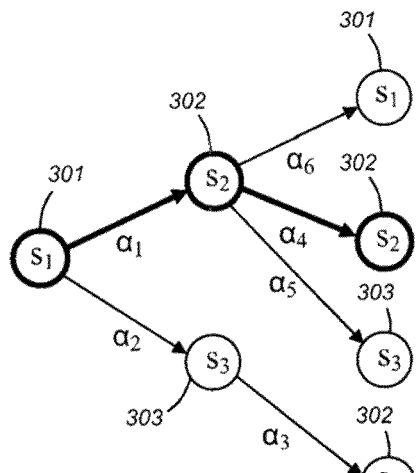
Figure 3:
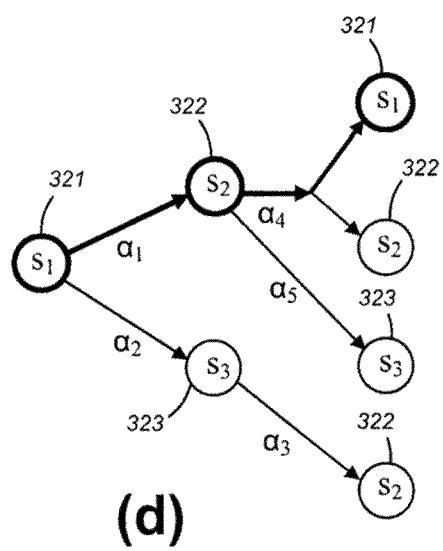
Figure 4:
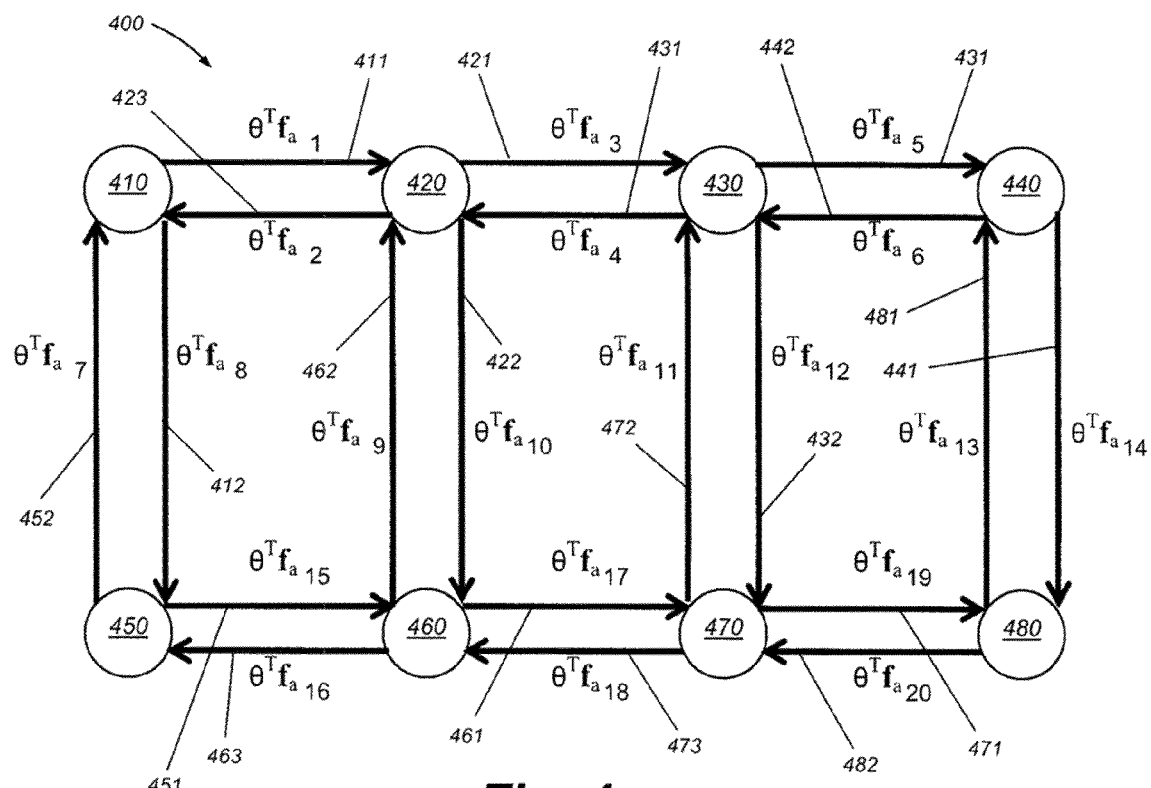
FIG. 4 illustrates a Markov Decision Process with action costs according to the illustrative embodiments.

Markov Decision Processes (MDPs) provide a natural framework for representing sequential decision making, such as route planning. The agent takes a sequence of actions ($\alpha \in A$), which transition the agent between states ($s \in S$) and incur an action-based cost (the negation of costs, rewards, are more common in the MDP literature, but less intuitive for our application) ($c(\alpha) \in \Re$). Behavior in the MDP corresponds to a path of (potentially) variable length ($1$-$1b$) for deterministic MDPs (FIG. 3A. Reference is now made to FIGS. 3A and 3B showing, respectively, a deterministic MDP and single path space. As shown, s1 (301), s2 (302) and s3 (303) represent road segments available for travel, and $\alpha 1$ to $\alpha 6$ represent possible paths therebetween, which are actions or transitions at intersections, for example. FIGS. 3C and 3D show a non-deterministic MDP and single path space, respectively, discussed below in greater detail. A simple deterministic MDP with eight states (410, 420, 430, 440, 450, 460, 470 and 480) and twenty actions (411, 412, 421, 422, 423, 431, 432, 433, 441, 442, 451, 452, 461, 462, 463, 471, 472, 473, 481 and 482) are shown in FIG. 4. Directed arrows represent actions that transition the agent between states (represented as circles).

The agent is assumed to be trying to minimize the sum of costs while reaching some destination. The sequence of actions can be called a path, $\zeta$. For MDPs with parametric costs, a set of features ($F_\alpha \in \Re_K$) characterize each action (as shown in FIG. 4), and the cost of the action is a linear function of these features parameterized by a cost weight vector ($\theta \in \Re^k$). Path features, $f_\zeta$, are the sum of the features of actions in the path: $\Sigma_{\alpha \in \zeta} f_\alpha$. The path cost is the sum of action costs (FIG. 4), or, equivalently, the cost weight applied to the path features.

$$\mathrm{cost}(\zeta \mid \theta) = \sum_{a \in \zeta} \theta^T f_a = \theta^T f_\zeta \qquad \text{Equation 1}$$

The MDP formulation provides a natural framework for a number of behavior modeling tasks relevant to ubiquitous computing. The advantage of the MDP approach is that the cost weight is a compact set of variables representing the reasons for preferring different behavior, and if it is assumed that the agent acts sensibly with regard to incurred costs, the approach generalizes to previously unseen situations.

Inverse Optimal Control

Much research on MDPs focuses on efficiently finding the optimal behavior for an agent given its cost weight as discussed in "Markov Decision Processes: Discrete Stochastic Dynamic Programming", *Wiley-Interscience* (1994) by M. L. Puterman. With focus on the inverse problem, that of identifying what a user is optimizing given demonstrated behavior (i.e., traversed driving routes). Research in *Inverse Optimal Control* investigates exactly this problem. Abbeel and Ng in "Apprenticeship leaning via inverse reinforcement leaning", *Proc. ICML* (2004) demonstrate that if a model of behavior matches feature counts with demonstrated feature counts, $\tilde{f}$ (Equation 2), then the model's expected cost matches the agent's incurred costs.

$$\sum_{\text{Path } \zeta_i} P(\zeta_i) f_{\zeta_i} = \tilde{f} \qquad \text{Equation 2}$$

This constraint has an intuitive appeal. If a driver uses 136.3 miles of interstate and crosses twelve bridges in a month's worth of trips, the model should also use 136.3 miles of interstate and twelve bridges in expectation for those same start destination pairs, along with matching other features of significance. By incorporating many relevant features to match, the model begins to behave similarly to the agent. However, many distributions over paths can match feature counts, and some are very different from observed behavior. In one example, the model can produce plans that avoid the interstate and bridges for all routes except one, which drives in circles on the interstate for 136 miles and crosses twelve bridges.

Maximum Entropy Principle

If the only concern is matching feature counts, and many different distributions can accomplish that, it is not sensible to choose a distribution that shows preference towards other factors that are not of concern. The mathematical formulation of this intuition is employed, the principle of maximum entropy, to select a distribution over behaviors. The probability distribution over paths that maximizes Shannon's information entropy while satisfying constraints (Equation 2) has the least commitment possible to other non-influential factors. For our problem, this means the model shows no more preference for routes containing specific streets than is required to match feature counts. In our previous example, avoiding all 136 miles of interstate and 12 bridge crossings except for one single trip is a very low entropy distribution over behavior. The maximum entropy principle much more evenly assigns the probability of interstate driving and bridge crossing to many different trips from the set. The resulting distribution is shown in Equation 3.

$$P(\zeta \mid \theta) = \frac{e^{-cost(\zeta \mid \theta)}}{\sum_{path\ \zeta'} e^{-cost(\zeta' \mid \theta)}} \qquad \text{Equation 3}$$

Low-cost paths are strongly preferred by the model, and paths with equal cost have equal probability. The denominator of Equation 3 is commonly referred to as the partition function, $Z(\theta)$.

This distribution over paths provides a stochastic policy (i.e., a distribution over the available actions of each state) when the partition function of Equation 3 converges. The probability of an action is weighted by the exponentiated rewards of all paths that begin with that action.

$$P(\text{action } a \mid \theta) \propto \sum_{\zeta: a \in \zeta_{t=0}} P(\zeta \mid \theta) \qquad \text{Equation 4}$$

In general MDPs, actions produce non-deterministic transitions between states (FIG. 3C) according to the state transition distribution. Paths in these MDPs (FIG. 3D) are now determined by the action choices of the agent and the random outcomes of the MDP. Our distribution over paths must take this randomness into account.

In this setting, the distribution over paths in the MDP is more naturally provided as the product of the distribution over actions and the random transitions between action outcomes. This distribution's recurrence relation is provided in terms of the algorithm used to compute it (Algorithm 3.1).

Compactness Advantage

Many different probabilistic models can represent the same dependencies between variables that pertain to behavior—context, actions, preferences, and goal. The main advantage of the PROCAB distribution is that of compactness. In a more compact model, fewer parameters need to be learned so a more accurate model can be obtained from smaller amounts of training data as the model attempts to learn a compact representation of the reasons for particular actions instead of attempting to memorize particular decisions.

Figure 5:
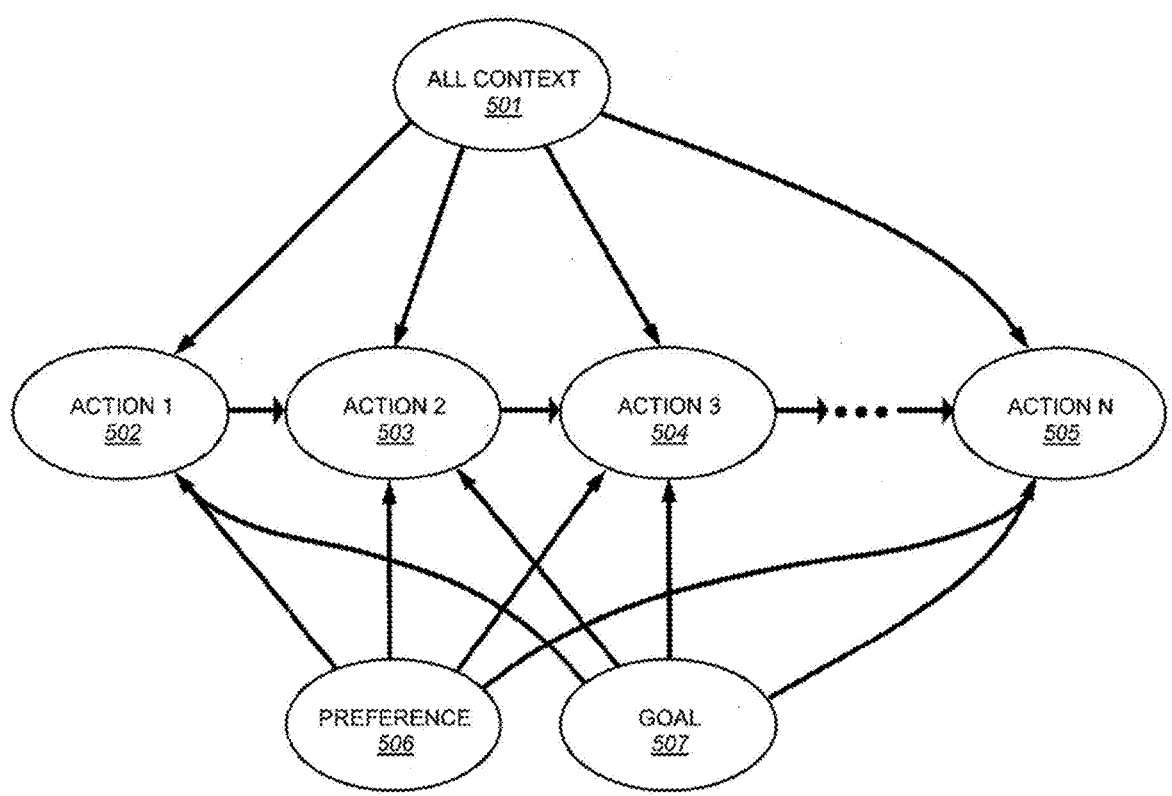
FIG. 5 illustrates a directed graphical model of sequential context-sensitive, goal-oriented, preference-dependent actions according to the illustrative embodiments.

Directly modeling the probability of each action given all other relevant information is difficult when incorporating context, because a non-myopic action choice depends not only on the context directly associated with that action (e.g., whether the next road is congested), but context associated with all future actions as well (e.g., whether the roads that a road leads to are congested). This approach corresponds to a directed graphical model (FIG. 5) where the probability of each action (502, 503, 504, and 505) is dependent on all contextual information 501, the intended destination (507), and personal preferences (506). If there are a large number of possible destinations and a rich set of contextual variables, these conditional action probability distributions requires an inordinate amount of observed data to accurately model.

Figure 6:
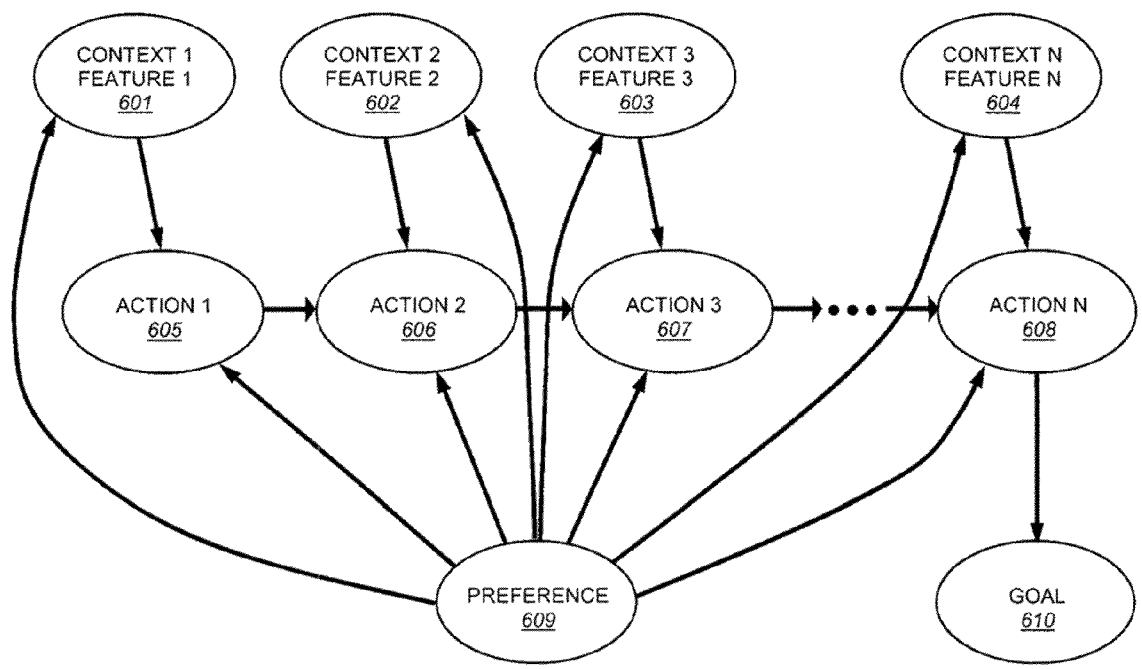
FIG. 6 illustrates an undirected graphical model of sequential context-sensitive, goal-oriented, personalized actions according to the illustrative embodiments.

The PROCAB approach assumes drivers imperfectly minimize the cost of their route to some destination (Equation 3). The cost of each road depends only on the contextual information directly associated with that road. This model corresponds to an undirected graphical model (FIG. 6), where cliques (e.g., "Action 1," "Context 1," and "Preference") define road costs, and the model forms a distribution over paths based on those costs. As shown in FIG. 6, each context or feature 601, 602, 603 and 604 affect each action 605, 606, 607, and 608. The preferences 609 are still applied to all contexts and actions, however only one goal 610 is provided in this model. If a road becomes congested, its cost increase and other alternative routes become more probable in the model without requiring any other road costs to change. This independence of context and features as shown in FIG. 6 is why the PROCAB model is more compact and can be more accurately learned using more reasonable amounts of data.

Probabilistic Inference

Future behavior is predicted using our PROCAB model by first training the model by finding the parameter values that best explain previously demonstrated behavior. Both prediction and training require probabilistic inference within the model. The inference of computing the expected number of times a certain action is taken given known origin, current state, goal state distribution, and cost weights (other inferences, like probabilities of sequence of actions are obtained using the same approach).

Algorithm 3-1 Expected Action Frequency Calculation

Inputs: cost weight $\theta$, initial state $s_o$, current state $s_c$, and goal state prior probability distribution $P(\text{goal } s_g)$ Output: expected action visitation frequencies $D_{a_{i,j}}$ Forward Pass (from Initial Location)
 1. Recursively compute for T iterations $$Z^i_{a_{i,j}} = e^{-cost(a_{i,j} \mid \theta)} Z^i_{s_i}$$

$$Z^i_{s_i} = \sum_{a_{j,i}\ to\ s_i} Z^i_{a_{j,i}} + I(\text{initial } s_o)$$

Forward Pass (from Current Location)
 2. Recursively compute for T iterations $$Z^c_{a_{i,j}} = e^{-cost(a_{i,j} \mid \theta)} Z^c_{s_i}$$

$$Z^c_{s_i} = \sum_{\text{actions } a_{j,i}\ to\ s_i} Z^c_{a_{j,i}} + I(\text{current } s_c)$$

Compute Goal Location Posterior Distribution and Weight
 3. For each goal location compute and normalize the probability distribution to 1:

$$P(\text{goal } g \mid \text{initial } s_o, \text{current } s_c) \propto \frac{Z^c g}{Z^i g} P(\text{goal } g)$$

Backward Pass
 4. Recursively compute for T iterations $$Z_{a_{i,j}} = e^{-cost(a_{i,j} \mid \theta)} Z_{s:a_{i,j}}$$

$$Z_{s_i} = \sum_{\text{actions } a_{i,j}\ of\ s_i} Z_{a_{i,j}} + \frac{P(\text{goal } s_i \mid \text{initial } s_o, \text{current } s_c)}{Z^c_{s_i}}$$

Summing Frequencies
 5. Combine partition functions $$D_{a_{i,j}} = \frac{Z^c_{s_i} e^{-cost(a_{i,j} \mid \theta)} Z^b_{s_j}}{Z^b_{s_{initial}}}$$

Figure 7:
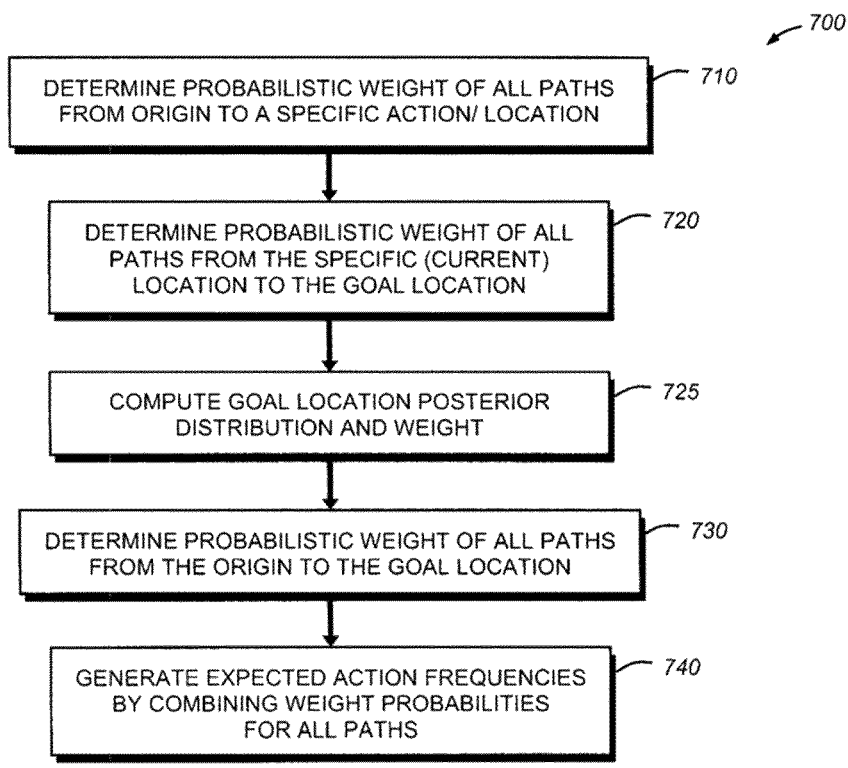
FIG. 7 is a flow chart detailing the steps to carrying out a state frequency determination procedure according to the illustrative embodiments.

Algorithm 3-1 is an efficient approach as shown above and illustrated in the flow chart of FIG. 7. As shown in FIG. 7 and the corresponding equations above in algorithm 3-1, the procedure 700 is initiated by finding the probabilistic weight of all paths from the origin (o) and from the current state (c) to a specific action (a) 710 and then all paths from the action to the goal location 720 (in practice, use a finite T, which considers a set of paths of limited length), $$Z_a = \sum_{\zeta_{o \to g}} e^{-cost(\zeta)}.$$

The procedure, employed as a behavior-predicting application, computes the goal location posterior distribution and weight at 725. Then it is normalized to 1 for analysis purposes. Then the probability weight for and all paths from the origin to the goal 730 are determined. Expected action frequencies are obtained by combining these results. These combined results at step 740 generate the expected action frequency by combining the weight probabilities for all paths.

The action distribution for non-deterministic MDPs is obtained by modifying the recursive backwards pass of Algorithm 3-1, as shown in Equation 6.

$$Z_{a_{i,j}} = e^{-cost(a_{i,j}|\theta) + \Sigma P(s'|a_{i,j}) log Z_{s:a_{i,j}}}$$ 
Equation 6

Cost Weight Learning

Our maximum entropy approach implies training of the model by finding the parameters that maximize the [log] probability of (and best explain) previously observed behavior.

$$\theta^* = \arg\max \log \prod_i \frac{e^{-cost(\tilde{\zeta}_i|\theta)}}{\sum_{path\,\zeta_j} e^{-cost(\zeta_j|\theta)}}$$
Equation 6

Algorithm 3-2 Learn Cost Weights from Data
Stochastic Exponentiated Gradient Ascent

---

Initial random $\theta \in \Re^k$, $\gamma > 0$
For t = 1 to T:
    For random example, compute $D_a$ for all actions a
        (Using Algorithm 3-1)
    Compute gradient $\nabla F$ from $D_a$ (Equation 3-5)

$\theta \leftarrow \theta e^{\frac{\gamma}{t} \nabla F}$

---

A gradient-based method is employed (Algorithm 3-2) for this convex optimization. The gradient is simply the difference between the demonstrated behavior feature counts and the model's expected feature counts, so at the optima these feature counts match. It is clear this is one possible embodiment of the invention and not the only possible way of determining the best parameters. The action frequency expectations is used, $D_a$, to more efficiently compute the gradient (Equation 7).

$$\tilde{f} - \sum_{Path\,\zeta_i} P(\zeta_i) f_{\zeta_i} = \tilde{f} - \sum_a D_a f_a$$
Equation 7

Algorithm 3-1 with $s_o = s_c$ and $P(S_g) = 1$ using the demonstrated path's origin and goal state to compute the action visitation frequencies efficiently. The algorithm raises the cost of features that the model is over-predicting so that they can be avoided more and lowers the cost of features that the model is under-predicting until convergence near the optima.

Modeling Route Preferences

In this section, the features are described that were employed to model the utilities of different road segments in our model, and machine learning techniques employed to learn good cost weights for the model.

Feature Sets and Context-Awareness

As mentioned, the characteristics of the road network describe speed, functionality, lanes, and turns. These combine to form path-level features that describe a path as numbers of different turn type along the path and road mileage at different speed categories, functionality categories, and numbers of lanes. To form these path features, combine the comprising road segments' features for each of their characteristics weighted by the road segment length or intersection transition count.

TABLE 1

| Feature | Value |
|---|---|
| Highway | 3.3 miles |
| Major Streets | 2.0 miles |
| Local Streets | 0.3 miles |
| Above 55 mph | 4.0 miles |
| 35-54 mph | 1.1 miles |
| 25-34 mph | 0.5 miles |
| Below 24 mph | 0 miles |
| 3+ Lanes | 0.5 miles |
| 2 Lanes | 3.3 miles |
| 1 Lane | 1.8 miles |
| Hard left turn | 1 |
| Soft left turn | 3 |
| Soft right turn | 5 |
| Hard right turn | 0 |
| No turn | 25 |
| U-turn | 0 |

The PROCAB model finds the cost weight for different features so that the model's feature counts match (in expectation) those demonstrated by a driver (e.g., as shown in Table 1, which illustrates example feature counts for a driver's demonstrated route(s)), when planning for the same starting point and destination. Additionally, unobserved features can make certain road segments more or less desirable. To model these unobservable features, add unique features associated with each road segment to our model. This allows the cost of each road segment to vary independently.

Our invention incorporates sensitivity to time of day and day of week by adding compound features that are only active during certain times of day and days of week. In an embodiment, use morning rush hour, day time, evening rush hour, evening, and night as our time of day categories, and weekday and weekend as day of week categories. Using these features, the model tries to not only match the total number of e.g., interstate miles, but it also tries to get the right amount of interstate miles under each time of day category. For example, if our taxi drivers try to avoid the interstate during rush hour, the PROCAB model assigns a higher weight to the joint interstate and rush hour feature. It is then less likely to prefer routes on the interstate during rush hour given that higher weight.

Matching all possible contextual feature counts highly constrains the model's predictions. In fact, given enough contextual features, the model can overfit to the training data, finding coincidental regularities in behavior and provide poor generalization to new predictions. This problem common to all statistical methods is overcome using regularization, a technique that relaxes the feature matching constraint by introducing a penalty term $(-\Sigma_i \lambda_i \theta_i^2)$ to the optimization. This particular penalty is one embodiment of the invention, but many others are possible and desirable. This penalty prevents cost weights corresponding to highly specialized features from becoming large enough to force the model to overfit observed behavior.

Learned Cost Weights

The cost weights are learned that best explain a set of demonstrated routes using Algorithm 3-2. Using this approach, cost weights are obtained for each driver or a collective cost weight for a group of drivers. In this section, the routes gathered from all twenty-five taxi drivers are grouped together and learn a single cost weight using a training set of 80% of those routes.

Figure 8:
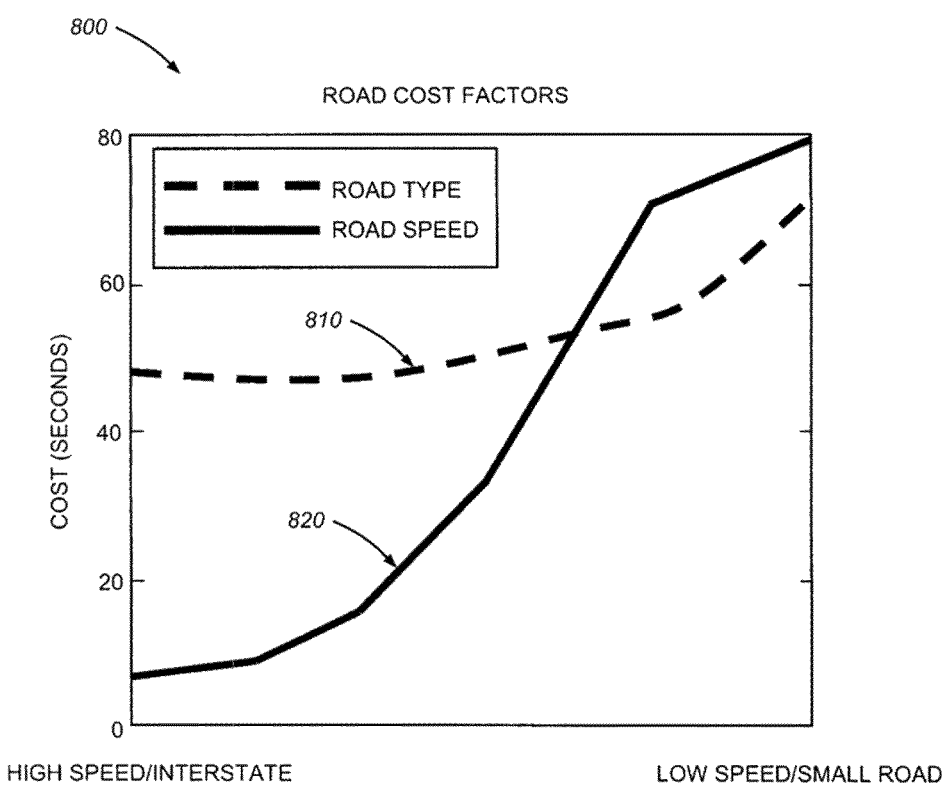
FIG. 8 illustrates speed categorization and road type cost factors normalized to seconds assuming 65 mph driving on fastest and largest roads, according to the illustrative embodiments.

FIG. 8 shows how road type and speed categorization influence the road's cost in our learned model. As shown by the graph 800 of FIG. 8, the road type 810 changes the cost, as at high speeds it is lower than at low speeds. Similarly, the road speed 820 affects the cost, in that at higher speeds, the cost is less, and it increases at higher speeds.

Navigation Applications

The illustrative embodiments provide probabilistic answers to queries about the user's next turn, future route, and destination in the presence of absence of knowing the user's intended destination. Route recommendation can be easily personalized based on passive observation of a single user. The most probable or high probability routes from the system trained to that particular user are provided to the user as recommendations. Further, by learning a probability distribution over driver preferences, destinations, and routes the PROCAB model of driver behavior can go beyond route recommendation, to new queries such as the probability whether a driver choose a particular street. This enables other applications, including, e.g., warning drivers about unanticipated traffic problems on their route without ever explicitly having to query the user about route or destination; optimizing battery and fuel consumption in a hybrid vehicle; providing location-based services using the future predicted location of the driver; and activating temperature controls at a home prior to the driver's arrival. The teachings of the illustrative embodiments are readily applicable to these and other devices or applications desiring to obtain and predict navigational decision making behaviors.

PROCAB Turn Prediction

The PROCAB model predicts turns by reasoning about paths to potential destination. Each path has some probability within the model and many different paths share the same first actions. An action's probability is obtained by efficiently summing up all path probabilities that start with that action.

Route Prediction

A second application of the invention is prediction, where the origin and destination of a route are known, but the route between the two is not and must be predicted. Two important applications of this problem are route recommendation, where a driver requests a desirable route connecting two specified points, and unanticipated hazard warning, where an application that can predict the driver encounters some hazard he is unaware of and warn him beforehand.

Our view of route prediction and recommendation is fundamentally different than those based solely on travel time estimates. There is a great deal of variability in route preference between drivers. Rather than assume drivers are trying to optimize one particular metric (e.g. minimize time) and more accurately estimate that metric in the road network, implicitly learn the metric that the driver is actually trying to optimize in practice. This allows other factors on route choice, such as fuel efficiency, safety, reduced stress, and familiarity, to be modeled. While the model does not explicitly understand that one route is more stressful than another, it does learn to imitate a driver's avoidance of more stressful routes and features associated with those routes.

Destination Prediction

Finally, in situations where a driver has not entered her destination into a navigation system, accurately predicting her destination is useful for proactively providing relevant information or suggesting an alternative route. Given the difficulty that users have in entering destinations, as elaborated by A. Steinfeld et al. in "Destination entry and retrieval with the aliscout navigation system", *The University of Michigan Transportation Research Institute No. UMTRI-96-30* (1996), destination prediction can be particularly useful. It can also be used in conjunction with our model's route prediction and turn prediction to deal with settings where the destination is unknown.

Using Bayes' Rule (Equation 8), route preference models that predict route (B) given destination (A) can be employed along with a prior on destinations, P(A), to obtain a probability distribution over destinations, P(A|B) (since the denominator is constant with respect to A, the probability is often expressed as being proportionate to the numerator):

$$P(A|B) = \frac{P(B|A)P(A)}{\sum_{A'} P(B|A')P(A')} \propto P(B|A)P(A) \qquad \text{Equation 8}$$

In the PROCAB model, destination prediction is also an application of Bayes' rule. Consider a partial path, $f^{\zeta_{A \to B}}$ rom point A to point B. The destination probability is then:

$$P(dest|\zeta_{A \to B}, \theta) \propto$$

$$P(\zeta_{A \to B}|dest, \theta)P(dest) \propto \frac{\sum_{\zeta_{B \to dest}} e^{-cost(\zeta|\theta)}}{\sum_{\zeta_{A \to dest}} e^{-cost(\zeta|\theta)}} P(dest) \qquad \text{Equation 9}$$

Figure 9:
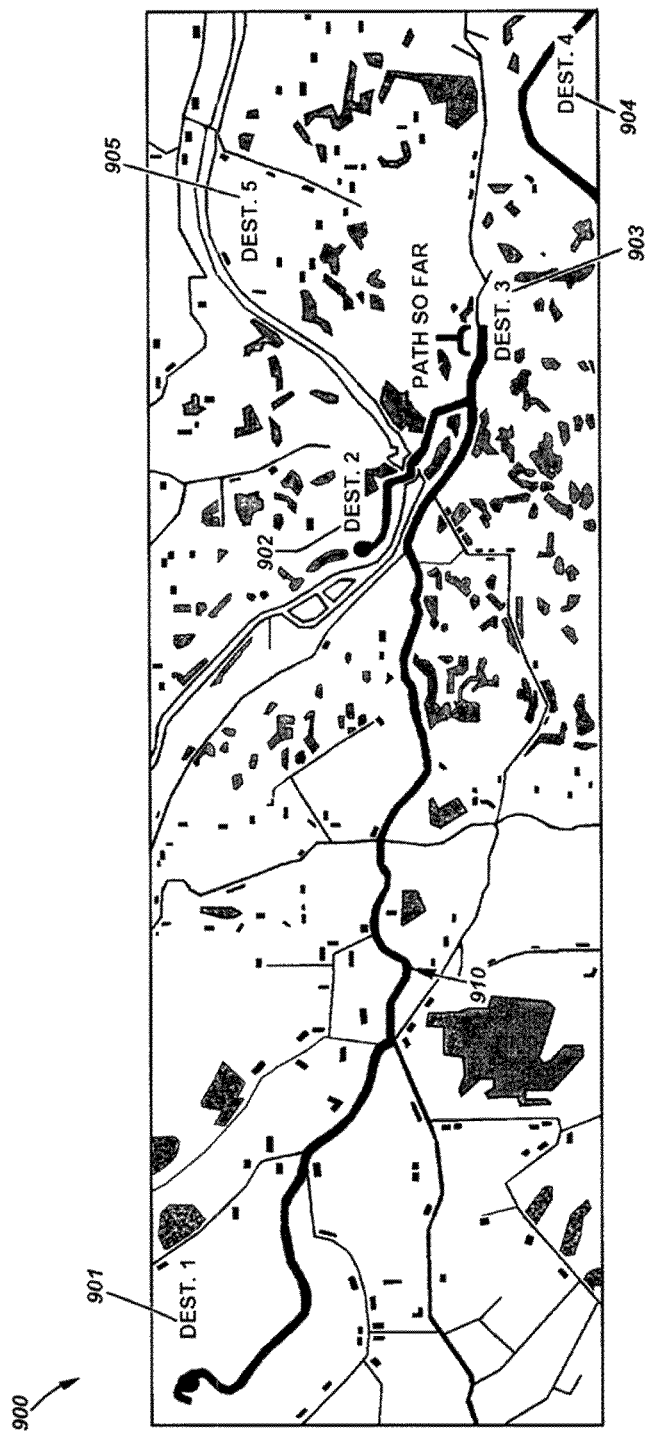
FIG. 9 illustrates a destination distribution and remaining path distribution according to the illustrative embodiments.

FIG. 9 shows one particular destination prediction model map 900. Routes are assumed to terminate in one of five locations 901, 902, 903, 904 and 905 around the city in this example (FIG. 9) and that destination location is predicted based on the fraction of total route observed 910. Previous empirical data or other known density estimation techniques are employed to create a prior probability distribution over destinations. Incorporating additional contextual information into this prior distribution, like time of day, is beneficial for our invention predicting the destinations of most drivers.

Figure 10:
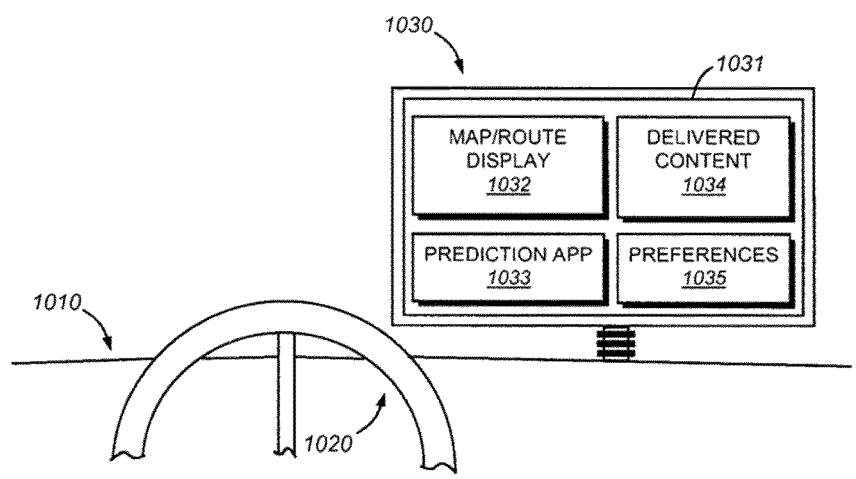
FIG. 10 is an exemplary device for predicting navigational routes according to an illustrative embodiment of the present invention.

FIG. 10 shows an exemplary application of the device for predicting an intended route based upon the context of the route traveled, as well as user preferences manually selected by the user, or the preferences derived according to the algorithms discussed hereinabove. As shown, an interior of a vehicle is shown having a dash 1010 and steering wheel 1020. The GPS-enabled predicting device 1030 is shown mounted on the dash 1010 of the vehicle. It is expressly contemplated that any appropriate device can be employed to perform the teachings herein for route planning and prediction of a device, vehicle, person or other entity, using appropriate location determining technology, such as GPS in FIG. 10. The device 1030 includes a conventional screen 1031, that in the illustrative embodiment is a touch-screen, and the various buttons are displayed and can be selected by touching the corresponding portion on the screen 1031. In other embodiments, the buttons can be replaced with voice-activated commands for transmitting instructions to the route behavior prediction application. These can be voice-activated prompts for both the input into the device for manual entry by the driver, and also for the output of the device, for communicating the predicted route that the driver intends to travel.

As shown in FIG. 1, when employing GPS technology, there is a GPS satellite in space that broadcasts signals which are picked up by the GPS device to determine the three-dimensional location of the device 1030. This is thus used to determine the intended route of a user.

The device 1030 further displays a map and/or route display 1032 showing a map of the area in which the user is traveling, as well as the route they intend to travel, as determined by the prediction application 1033. On the screen, this can comprise an icon or other appropriate button for initiating the application. This results in content being sent to the device relevant to the intended route, which is displayed at 1134. And the user has a series of buttons 1035 that allow the user to select preferences for the device 1030 to determine the intended route and provide data to the prediction application 1033.

Other variations and modifications of the present invention are possible and contemplated, and it is intended that the foregoing specification and the following claims cover such modifications and variations.

Review of Illustrative Embodiments

The present invention is generally directed to predicting decision-making behavior for navigation between locations and related applications and technology. Illustrative embodiments of the system and method herein have has many variations and applications. For example, an illustrative embodiment can be used for route recommendation in an automobile navigation system, for route planning in non-automobile applications (such as for use by pedestrians or wheelchair users via mobile phones and PDAs), for schedule planning (such as for planning household schedules with "to-do" lists, appointments, and other scheduling items), for scheduling facility operations (such as predicting where people are at particular times; controlling lighting, heating, cooling, and other operations of buildings, scheduling maintenance tasks, and scheduling downtime of systems), and for evaluating a user's decision-making ability (such as evaluating a person's ability to safely operate an automobile or other equipment). Various illustrative embodiments also have other applications and advantages, some of which are described below to further illustrate the illustrative embodiments.

It is noted that the term "driver" as used herein can be taken broadly to include operators of a variety of motorized and manually powered vehicles, such as bicycles, boats and aircraft, as well as an individual undertaking manual motion activities such as walking or running. Additionally, the term "device" as used herein can be taken broadly to include any device for navigational purposes on any vehicle or on an individual person.

The present invention can be embodied, for example, as an automobile navigation system that uses real-time context such as traffic information, weather information, construction information, user tasks (e.g., to-do items), and driver preferences (learned from actual driving, learned from expert drivers, and manually specified by users) to improve the routes provided to drivers.

The present invention can also produce routing information outside of an automobile. For example, this information can be accessed via the Internet, it can be resident on mobile devices, or it can be accessed through stand alone computers or computer systems.

The present invention has many variations, such as allowing users to correct provided routes, allowing users to provide new static or temporary preferences; and predicting a user's route and destination and, therefore, anticipate the user's needs and determine whether there is a significantly better route which can be provided to the user. This also includes a variation of being able to identify appropriate routes for a particular user based on their profile (e.g., demographics) and driving preferences, by leveraging the profiles and preferences of other drivers, to support both new users for which there is little data, and to support drivers driving in a new city. As well, another variation of the invention is to support hierarchical modeling, e.g., providing routes at multiple different levels: between cities, within a city, between sites in a city.

The present invention can also be implemented so as to perform computations that react in real time to changes in driving preferences or real-time context. The present invention has the ability to adapt quickly to changes in preferences/context, by which means the illustrative embodiments can be applied to a wide variety of applications and domains which go beyond routing/navigation. An embodiment, the present invention supports real time planning of vehicle routes based on changes in context such as weather, construction, accidents, and traffic, as well as changes in driver preferences. This results in a system that can not only produce routes that better match the way a driver drives, but also can produce revised routes that match the way a driver drives when new information about traffic or weather is available or the driver changes the way they want to drive. The illustrative embodiments are able to personalize routes in the face of changing context/preferences in an efficient manner that supports real-time re-planning.

Various embodiments also offer advantages in other applications. For example, the illustrative embodiments can be applied to mobile robots that know the terrain on which they intend to be traveling but need to learn their abilities for traversing different terrains while traversing the terrain and planning an appropriate route. Illustrative embodiments can also be applied to problems of imitation and inverse reinforcement learning where an agent's preference weights are recovered from demonstrated behavior of the agent. A number of prior art approaches repeatedly find the shortest paths for differing preference weights and can be enhanced by the illustrative techniques for efficient planning.

Illustrative embodiments also support the creation of context-enhanced routes between a start and destination point. Routes can be improved by leveraging contextual cues such as time and day of request or travel, weather, traffic and accidents, and these improved driving directions can be provided as a web service or, more generally, via the Internet. For example, on the resulting web page, users can manually modify the route provided, by either specifying an area on the map that they desire the route to go through or specifying an area on the map that they want the route to avoid. If a user logs in to this web service, all routing requests, along with all corrections provided, can be used to update an individual model of the user. This model is the result of inferring preferences from user corrections. When the user returns to the website, the user model is used to create a customized route for her, based on her preferences.

Illustrative embodiments can be used via the Internet or via other networks, computers, or computer systems. An illustrative embodiment is used to provide provides all users (even those that choose not to login) improved routing. In addition, beyond the context-enhanced routes, aggregated models of other users/drivers can also be used to provide customized routes. For example, by creating user models from the driving behavior of taxi drivers, illustrative embodiments can be used to create one or more models of "optimal drivers" who have considerable knowledge of the roads. Similarly, aggregated models can be applied using a collaborative-filtering type approach to match individual drivers to groups. In addition to using models of "optimal drivers", the present invention illustrative embodiments can use up to date information about weather, accidents and traffic and other contextual factors that impact a driver's route (e.g., to-do tasks, sporting events), to make choices when selecting a route.

Illustrative embodiments can include a probabilistic route preference model based on context-sensitive and user-dependent cost functions for road segments and intersections of the road network. Each road segment and intersection has a number of features that describe its characteristics. Illustrative embodiments can use a cost function to map these features, along with contextual information, and user characteristics to a real-valued cost for transitioning through that segment or intersection. A probabilistic preference distribution over path costs can be employed to generate a distribution of path preference over possible paths. The cost functions are learned by optimizing the likelihood of empirical paths provided by a user or group of users. Inference on the resulting path preference model obtained by employing the learned cost functions provides a number of useful applications, such as route planning (using the single most likely path), path prediction (using the distribution over paths with origin-destination pair priors), and destination prediction (inferring a distribution over potential destinations based on a partial trajectory).

As described above, the illustrative embodiments can be used with in-car navigation systems, web-based route planning systems, and mobile devices such as cell phones and PDAs. The context-aware routing technology of the present invention can also be used with map routing services on the web (Google Maps, Yahoo Maps, MapQuest, etc.). More advanced routing technology, such as that which takes advantage of GPS data from a user's car or from other GPS-enabled devices can be used with in-car navigation systems.

In an illustrative embodiment, methods and apparatuses are provided for modeling real world navigation and driving behaviors where collected data is inherently noisy and imperfect. Illustrative embodiments can employ a probabilistic approach which enables modeling of route preferences as well as inferring destinations and routes based on partial trajectories.

Another embodiment includes a method and apparatus for Probabilistically Reasoning from Observed Context-Aware Behavior (sometimes referred to as "PROCAB"). It models the context-dependent utilities and underlying reasons that people take different actions. The model generalizes to unseen situations and scales to incorporate rich contextual information. In one embodiment, the model according to an illustrative embodiment was trained using the route preferences of twenty-five taxi drivers demonstrated in over 100,000 miles of collected data, and demonstrate the performance of the model by inferring: (1) decision at next intersection, or turn prediction, (2) route to known destination, and (3) destination given partially traveled route.

Another embodiment calculates "turn predictions" and provides instructions and suggestions to drivers based on these predictions. For example, the present invention an embodiment has applications in controlling automotive systems such as turn signals, directional headlights, automatic sun shields, and other features which can be activated or modified based on the predictions from an embodiment. For example, an illustrative embodiment is used to determine that the driver will be making a right turn, then the right turn signal can be automatically activated before the car begins to turn. Similarly, if the car is equipped with directional headlights that can be adjusted the left or right to provide better illumination when turning, then the headlights can be adjusted prior to the driver actually initiating the turn so as to provide earlier illumination in the direction in which the driver intends to turn. Likewise, an automatic sunshield can be deployed or adjusted in anticipation of the car turning so as to shield the driver's eyes from the sun before the car is in a position to have the sun interfere with the driver's vision.

Illustrative embodiments can also be used to advise the driver of road conditions, such as ice, snow, steep grades and other road conditions along the driver's predicted route. In this way, the driver can be advised of the road conditions well in advance of being on the affected road, thereby allowing the driver to adjust the route if the road conditions are unacceptable.

Illustrative embodiments can also be used to make adjustments to the operation of the car in anticipation of the driver's route. In particular, the parameters and operation of the car can be adjusted in anticipation of changing conditions, thereby allowing for better performance. For example, and gasoline-electric hybrid car can be operated in one manner if it is known that the car will be operated in stop and go traffic in the near future, while it can be operated in a significantly different manner if it is known that the car will be climbing a long, steep grade in the near future. Similarly, the parameters of a conventional car can also be changed to allow for more efficient operation or other desired characteristics if the manner in which the car is to be used is known in advance. As a result, the operation of the car can be adjusted in anticipation of changing conditions prior to those conditions affecting the performance of the car. In this way, cars can be made to operate more efficiently or in some other desired fashion. Many other variations are also possible, and these aspects of the illustrative embodiments are not limited to cars, but can also be used with other vehicles.

In another embodiment, the illustrative embodiments operate to provide instructions and suggestions to a driver so as to leverage knowledge about how others drive. By comparing the learned and/or collected preferences and profile information for an individual driver, to those of other drivers, a subset of drivers can be selected that best match the individual driver. The individual driver can be provided directions and routing support using information about how the subset drives. This supports a number of interesting services, including 1) bootstrapping a new user of this invention while a model is being developed for the user, and 2) helping a user who is traveling to a different city to drive like drivers in that city. It is noted that the illustrative embodiments, without this support, can allow drivers to drive like themselves when they travel to new cities, even if they have never visited the new cities.

Another embodiment, the present invention can be used to optimize and plan trips, and it can be used for planning multiple waypoints. For example, a vacationer can select criteria such as a sequence of cities or other locations to visit, a list of sites to see in at each city or location, transportation between the sites, and other criteria involving their travels. Illustrative embodiments can be employed at each level of the hierarchy of data provided by the user to create travel plans and provide other services such as are described herein. Goals and/or preferences at each level of the hierarchy will interact with those from other levels, resulting in a more complex optimization problem, but one that can be addressed with this invention.

The various embodiments herein can be implemented, for example, as computer software which, when executed by a processor, causes the processor to perform certain actions according to the illustrative embodiment. An embodiment can be implemented as a system including a processor, memory, an input device, and an output device, and wherein the memory includes computer-readable instructions which, when executed, cause the processor to perform certain actions according to the various embodiments. Illustrative embodiments can also be implemented as a single device or as more than one device.

Many other variations are possible with the illustrative embodiments. As described above, the illustrative embodiments can be used, for example, to improve routing systems on the web, on mobile devices with or without GPS units and in-car navigation systems. Illustrative embodiments can offer routes based on expert drivers, customized routes based on stated and inferred driver preferences, improved routes based on real-time context, and combinations of these three; allows user to correct/modify provided routes; can predict both the driver's route and destination to determine whether there is a better route for the driver (allows completion of a to-do task, faster, less traffic, etc.) and then deliver that improved route to the driver. Various embodiments can be used to integrate with a user's to do list, either explicitly provided or inferred from a user's set of personal information management tools (e.g. Outlook). This allows the creation of routes that adhere to the driving preferences of a user, while taking the user slightly off the optimal path in order to complete necessary tasks (e.g. grocery shopping, picking up dry cleaning) Illustrative embodiments can be used with elders to infer not only their driving preferences but also their driving abilities. The purpose of this is not necessarily to diagnose elders' capacity to drive, but to avoid routes that create additional stress or cognitive load (e.g. difficult left turn at a busy intersection).

The foregoing has been a detailed description of illustrative embodiments of the invention. Various modifications and additions can be made without departing from the spirit and scope of this invention. Each of the various embodiments described above can be combined with other described embodiments in order to provide multiple features. Furthermore, while the foregoing describes a number of separate embodiments of the apparatus and method of the present invention, what has been described herein is merely illustrative of the application of the principles of the present invention. For example, the invention has been described herein largely in the context of an automobile having GPS-enabled technology, however is and can be applied to any number of devices that have a route or a plurality of paths of travel, as well as any communications mean that determine the location and/or route of the user. These devices can include in-car GPS systems, cellular telephones, or any other device. Can similarly be implemented on a motorcycle or bicycle, or other transportation vehicle. Accordingly, this description is meant to be taken only by way of example, and not to otherwise limit the scope of this invention.

What is claimed is:

1. A system for predicting navigational decision-making behavior comprising:
   a route predicting device having a location unit that determines a current location of the device; and
   a behavior predicting application that generates a predicted route a current driver is intending to travel based on the current location of the device and a plurality of predetermined factors that predict the route the current driver is intending to travel, the predetermined factors including other driver data for a plurality of other drivers;
   wherein the behavior predicting application generates the predicted route by gathering the other driver data from the plurality of other drivers and comparing the other driver data from the plurality of other drivers to those of the current driver to select a subset of drivers from the plurality of other drivers having behavior patterns that best match the current driver.

2. The system of claim 1 wherein the predetermined factors include driver preferences that indicate a discrete path the current driver is intending to travel based on preferred modes of operating a vehicle, and a frequency of a state of the device based on previously stored locations of the device.

3. The system of claim 1 wherein the location unit is a GPS receiver that communicates with a GPS satellite system to determine the current location of the device.

4. The system of claim 1 wherein the location unit comprises at least one of a gyro and an accelerometer that determines the current location of the device.

5. The system of claim 1 wherein routes gathered from each of the plurality of other drivers are grouped together to provide a single cost weight that is used in generating the predicted route.

6. A method for predicting navigational decision-making behavior of a driver comprising the steps of:
   obtaining driver preference data containing driver preferences for a current driver;
   obtaining routes traveled data based upon a current location of a device and at least one past location of the device; and
   generating, with a processor, a predicted route based on the driver preference data and the routes traveled data and by gathering other driver data from a plurality of other drivers and comparing the other driver data from the plurality of other drivers to those of the current driver to select a subset of drivers from the plurality of other drivers having behavior patterns that best match the current driver.

7. The method of claim 6 wherein the driver preference data is obtained manually from the driver.

8. The method of claim 6 wherein the driver preference data is obtained by monitoring a driving style and behavior pattern of the driver employing the device to learn the driver preferences.

9. The method of claim 6 further comprising analyzing the driver preference data and the routes traveled data to improve the predicted route.

10. The method of claim 9 wherein the step of analyzing is performed using an inverse reinforcement learning approach.

11. The method of claim 9 wherein the step of analyzing is performed using a maximum entropy principle.

12. The method of claim 6 wherein a driver's navigation is guided by directions based on the predicted route.

13. The method of claim 6 further comprising aggregating data to leverage increased statistical power for a group of drivers.

14. The method of claim 6 wherein a goal location of the driver is known, and is manually entered by the current driver to generate the predicted route.

15. The method of claim 6 wherein the predicted route is generated based upon an unknown goal location.

16. The method of claim 6 further comprising providing the driver with additional data relevant to the predicted route of the current driver.

17. The method of claim 16 wherein the additional data includes advertisements based upon the predicted route of the current driver.

18. The method of claim 6 wherein the device includes a processor that obtains the current location received from the GPS receiver and transmits the current location to a behavior predicting application to generate the predicted route.

19. The method of claim 6 further comprising the step of grouping together routes from each of the plurality of other drivers to provide a single cost weight that is user in generating the predicted route.

20. A display screen for displaying a predicted route based on navigational decision-making behavior, the display screen comprising:

a route display screen showing a map of an area surrounding a current location of a driver;

an intended route image showing the predicted route that the driver intends to travel, as determined by a prediction application; and a plurality of buttons allowing the user to interface with the prediction application that determines the route that the driver intends to travel;

wherein at least one of the plurality of buttons allows the user to interface with the prediction application to generate the predicted route by gathering the other driver data from the plurality of other drivers and comparing the other driver data from the plurality of other drivers to those of the current driver to select a subset of drivers from the plurality of other drivers having behavior patterns that best match the current driver.

21. The display screen of claim 20 wherein the display screen is a touch-screen and the plurality of buttons are displayed and can be selected by touching the corresponding portion of the display screen.

* * * * *